Nov. 20, 1923.
G. S. WARD
1,474,746
MANUFACTURE OF LEAVENED BREAD
Filed April 18, 1923
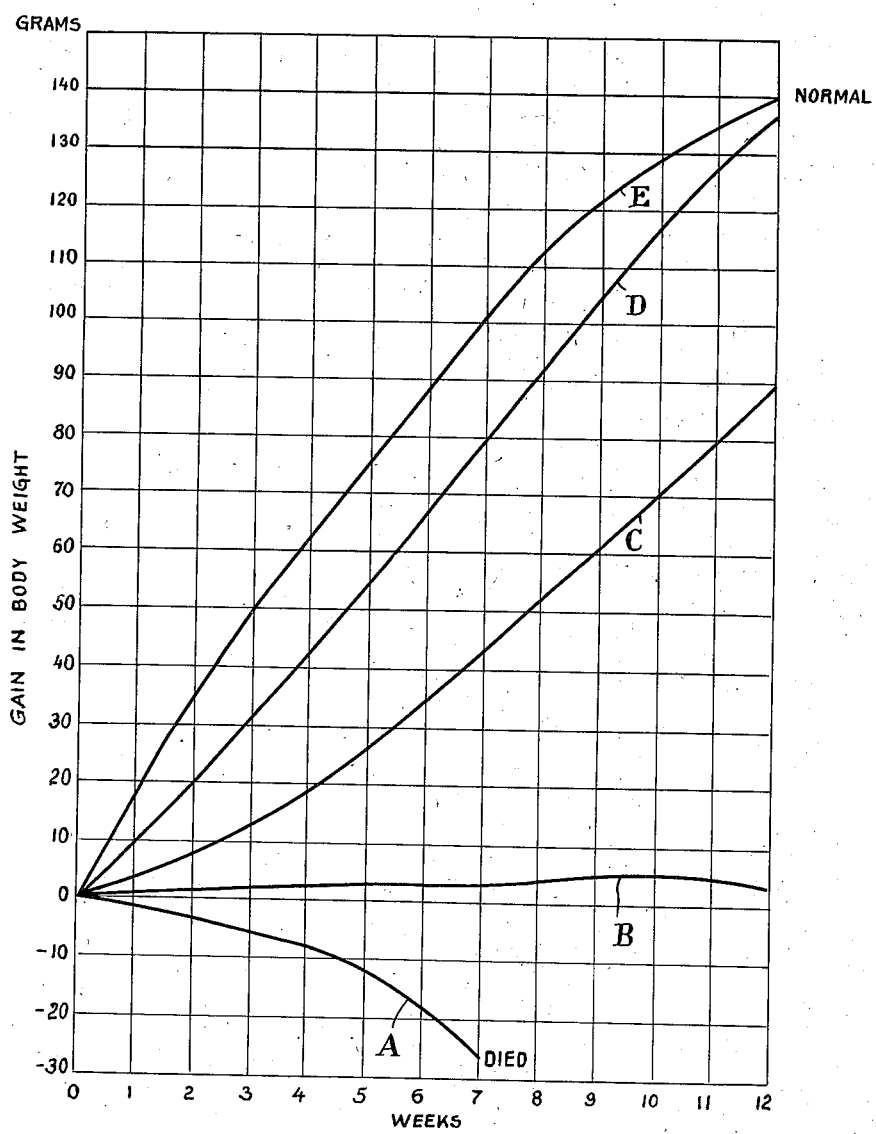
INVENTOR
George S. Ward
BY
Rennie, Davis, Marvin & Edmonds
his ATTORNEYS.

Patented Nov. 20, 1923.

1,474,746

UNITED STATES PATENT OFFICE.

GEORGE SUMMERVILLE WARD, OF NEW YORK, N. Y.

MANUFACTURE OF LEAVENED BREAD.

Application filed April 18, 1923. Serial No. 632,872.

*To all whom it may concern:*

Be it known that I, GEORGE S. WARD, a citizen of the United States, residing at New York city, in the county of Bronx, State of New York, have invented certain new and useful Improvements in the Manufacture of Leavened Bread; and I do hereby declare the following to be a full, clear, and exact description of the invention, such as will enable others skilled in the art to which it appertains to make and use the same.

In the manufacture of leavened bread according to the best existing commercial practice the dough batch comprises as its usual ingredients flour, water, milk, sugar, salt, a suitable shortening compound such as lard or vegetable oil, malt extract, yeast, and preferably a yeast food of some kind employed for the purpose of stimulating the growth of the yeast and maturing the gluten of the dough.

A finished loaf of bread made up from a dough containing these ingredients does not contain in proper amount all of the constituents necessary to a balanced food and such bread will not provide for normal growth and will not sustain life for any appreciable time when employed as the sole article of diet. A loaf of bread of this nature contains only a moderate amount of vitamines. The deficiency in vitamines is, in part, due to the fact that bolted or so-called white flour is used in the manufacture of the bread. A loaf made from white flour is attractive in appearance and the popular demand has placed the production of white bread far ahead of that of any other type. The parts of the wheat which are bolted from the white flour include the wheat germ and the bran. These portions of the wheat kernel, however, contain a large percentage of the total amount of vitamines occurring in the wheat and also contain certain organic and inorganic salts and relatively large quantities of the more soluble proteins which are required in a normal diet to help to balance the proteins such as those occurring in the bolted white wheat flour.

Various attempts have been made to utilize the by-products arising from the milling of flour without, however, attaining marked or permanent commercial success. Chief amongst these efforts have been the endeavors to incorporate these by-products into a baked loaf of bread and probably the whole wheat loaf has met with greater success than any of the other products of this nature.

It has also been proposed to treat these by-products, as by roasting and grinding and also by making of them extracts or other products which may subsequently be used in the manufacture of a bread. All of these proposals have met with a great deal of difficulty and have in the main been entirely unsuccessful. In the first place it has generally been impossible to prepare an extract or product which can be used in the manufacture of bread and at the same time permit of the production of a well leavened and otherwise satisfactory loaf which presents a pleasing appearance and which has the appetizing qualities possessed by the present commercial white bread.

In addition to the above considerations, it may be pointed out that a whole wheat bread or a bread employing an extract or product derived from such material as the bran and germ of grains is necessarily deficient in certain constituents requisite to the production of a balanced ration. That is, the constituents as occurring in the wheat grain itself do not constitute a balanced food. I have found that when whole wheat or a bread made from whole wheat is employed as the sole article of diet, the nutritive elements derived from such foods are not sufficient to sustain health and to provide for normal growth and development as would occur were a perfectly balanced ration employed. The same is true where bread or other flour products incorporating extracts from the bran and germs of grains are employed. It will be understood, however, that the whole wheat bread and similar products show an increased nutritive value over the present day commercial white bread.

It is a principal purpose of this invention to produce a bread which in itself is a balanced food, that is, a bread which when employed continuously as a sole article of diet will supply everything (except the antiscorbutic vitamine C) necessary to sustain life and health and to promote substantially normal growth and body development. In carrying out the invention I prefer to utilize those health promoting and body building elements contained in the portions of grain such as the germ, bran and the like which are commonly discarded in the milling process and in addition to supply to the bread certain further elements necessary to constitute a balanced food, which elements are lacking even in the whole grain.

It is a further purpose to produce a bread of this character which is white in color and which will have an expansion, bloom and texture, comparable in all respects with present day commercial white bread. That is, it is the intent of the invention to produce a white bread possessing all the advantages of the present day white bread which has gained universal favor in the trade, and which at the same time will far exceed such present bread in nutritional value and will in fact be in itself a balanced food.

In attaining these objects I incorporate into the bread, in addition to the ingredients such as white flour, yeast, sugar, shortening and the like, certain constituents of such character that the finished bread product will contain all of the proteins in properly balanced form which are requisite to a well balanced diet, such added constituents particularly having an adequate content of the more soluble proteins which are commonly deficient in white flour and in bread baked from such flour. I also supply to the bread certain organic and inorganic salts in properly balanced form, and regulate the carbohydrate content in such fashion as to properly balance the total ingredients of the product. I further provide for the occurrence and proper distribution of the accessory food substances called vitamines in amounts sufficient for normal needs, with the one exception, that I prefer to leave the product deficient in the antiscorbutic vitamine C which vitamine occurs in abundance in certain fruits, fresh garden produce, and the like, and which may be conveniently obtained by incorporating sufficient quantities of these wholesome fresh products in the diet.

In the manufacture of my improved bread, the ordinary commercial bread making processes may be followed with practically no change in the mixing and treatment of the ingredients. That is, for bread made according to the straight dough process the flour, salt, shortening, milk, and the like, are weighed and placed in the mixer. The yeast is dissolved in a part of the water to be incorporated in the dough batch and the yeast food and sugar material are also dissolved in water and these ingredients are then added to the mass in the mixer, after which the mixer is operated until a satisfactory dough is produced. The dough is then allowed to rise and mature to the desired extent, the dough being preferably worked a certain amount during the fermentation and maturing period in the usual manner to insure a thorough and uniform development of the dough. The loaves are then formed, are proofed in the pans, and baked in the ordinary manner. Similarly, my improved bread made according to the sponge process may be carried out substantially in the fashion now employed in commercial production of white bread.

In producing the improved bread of my invention I employ in addition to the above mentioned normal ingredients of the dough batch the sugary compound derived from cereal germ as described in United States Patent No. 1,431,525 granted to Charles Hoffman, Harry D. Grigsby and Nathan D. Cregor, on October 10th, 1922, which sugary product in addition to satisfying the sugar requirements of the batch also produces a loaf of bread having a high content of the water-soluble B vitamine. This compound may be derived from milling by-products, such as for instance wheat germs, bran, maize germs, and rice polishings, by a suitable process of extraction and saccharification. The product is exceedingly rich in the B vitamine and at the same time has a high content of certain organic and inorganic salts and the more soluble proteins which are lacking in milled white flour. The use of this product in the manufacture of bread is described in the above mentioned patent and it is to be understood that the present invention does not specifically contemplate a bread made with the usual ingredients and the addition alone of the above mentioned sugary compound.

The bread made with the use of the above mentioned sugary compound as the sole addition to the usual bread formula, particularly when rich in milk, containing as it does a large percentage of the B vitamine, will sustain life and produce a better growth than will either white bread or whole wheat bread. It is, nevertheless, not a balanced food and will not produce a normal growth and development when employed as a sole article of diet. The protein and mineral salts present in the sugary compound, while of value in providing a better protein balance and a better mineral salt balance in the bread, are not sufficient to make the loaf a complete food.

For the purpose of supplying to the bread the additional proteins required to constitute a balanced food, I add to the dough batch a quantity of whole milk sufficient to enrich the final product in these elements to the proper extent, the milk being particularly rich in such proteins as are required. I have found that even though the entire moisture requirement of the dough batch be supplied in the form of whole milk the resulting bread product is, nevertheless, deficient in the requisite proteins. To overcome this deficiency I increase the quantity of milk solids in the loaf by adding a portion of dry powdered milk, either whole milk, or milk with a portion of the butter fat removed. It will be understood that I may supply all of the moisture to the dough batch in the form of milk and in addition add a certain quantity of powdered milk for the purpose of bringing up the content of the resultant bread product to the desired nutritive standard. I may, however, employ water as the moistening agent for the batch and add the entire portion of the milk in a dry powdered form. Comparable results will be obtained as long as the total quantity of milk solids added is sufficient. When the entire milk content is supplied in the form of a powder about 10-12% of dry whole milk powder calculated on the weight of the flour employed is normally sufficient to produce an ultimate product of the desired characteristics. Similarly, if the entire moisture requirement of the batch is supplied in the form of whole milk it will be necessary to add say from 3-5% of whole powdered milk (calculated on the weight of the flour) in addition to the liquid milk employed in order that the final product will have the proper protein balance. It will be understood that the percentages given are subject to some variation dependent upon the composition of the milk employed. In adition to supplying the needed proteins the milk also serves as a valuable source for a certain amount of vitamines and mineral salts.

A loaf made up in this manner shows a greatly improved nutritional value over the ordinary loaf of white bread or whole wheat bread and also shows a marked improvement over the loaf employing the above referred to sugary compound containing a large percentage of B vitamine. The nutritional value of this loaf, however, falls short of a balanced food and I have found that this deficiency lies in part in the absence of necessary mineral matter and in part in the absence of the required proportion of vitamine A. This mineral matter may be added to the dough batch in the form of inorganic salts, and to this end certain innocuous calcium salts such as calcium phosphate or calcium sulphate may be added in the requisite quantities.

Although the added milk serves as a valuable source of fat soluble A vitamine, I have found that a quantity of added milk solids sufficient to supply the necessary protein may still leave the bread deficient in fat-soluble vitamine A. It is therefore necessary to supply to the loaf a further quantity of such vitamines. This may conveniently be done by employing a shortening compound rich in such vitamine and for this purpose I prefer to use a cold pressed beef fat of low melting point sold under the commercial name of oleo oil as a shortening agent to the extent of about 3% calculated on the weight of the flour in the batch. A bread made according to the invention of this application is now being manufactured and sold on the market. The formula employed for this commercial bread is as follows:

196 lbs. Flour.
135 lbs. Whole milk containing substantially 3½ per cent butter fat and 12½ per cent total solids.
5 lbs. Whole milk powder.
6 lbs. Oleo oil.
3½ lbs. Salt.
4½ lbs. Yeast (or less if additional yeast food is used).
10 lbs. Vitamine preparation described in the above mentioned patent to Hoffman et al. and 1½ lbs. of calcium salts consisting preferably of ½ calcium acid phosphate, ¼ calcium sulfate and ¼ calcium carbonate.

The process of making the bread is not altered in any way except that it is found to be preferable to run the dough as a "cool" dough; that is, a dough set from the mixer at not over 78° F.

The particular salt mixture given in the above formula is not my individual invention, and is therefore not claimed in this application. The said salt mixture has certain advantages in the bread-making process not possessed by other mixtures of calcium salts which furnish the requisite calcium content in the bread. My invention contemplates the use of any innocuous calcium salt which supplies calcium in a form to be assimilated. Calcium sulfate and calcium phosphate are suitable for this purpose, and there are various other salts of calcium which are well known for supplying the calcium deficiency in human nutrition. The quantity of calcium salt added to the formula will of course vary with the particular salt used, the relative values of different calcium salts from the standpoint of supplying the calcium deficiency in foodstuffs being well known.

A loaf of bread embodying all of the above products and compounds is in itself a sufficiently perfect food. The bread is of a creamy white color, is of the customary lightness and is possessed of excellent keeping and eating qualities.

For the purpose of illustration I have appended to this application a drawing containing certain curves which represent the results of feeding experiments conducted with a view to determining the nutritional value of certain foods. The experiments were carried on in the usual manner, namely, an equal number of animals (white rats or pigeons) were fed with the food to be tested and the average weight for each lot tabulated. The curve A shows the results when present day white bread is employed as the sole article of diet. It is seen that this bread is not capable of promoting growth or of sustaining life to any considerable length.

Curve B shows that whole wheat bread is capable of sustaining life somewhat better than does white bread, but is entirely lacking as a balanced food. Curve C shows the result when a loaf employing the sugary compound containing the B vitamine and whole milk as the entire liquid content of the dough, as mentioned in this application and described in the patent to Hoffman et al. above referred to, is used as a sole article of diet. It is seen that this bread will sustain life and will promote growth, but that the results are still far short of the normal growth of curve E. The curve D shows the results when the loaf of curve C is supplemented by the addition of the extra milk solids, the lime salts and the oleo oil as above described, and it is to be noted that the nutritional value of this loaf alone approaches closely the results obtained when a balanced ration of the most approved sort is used, the normal growth curve E indicating the results obtained by such a ration.

The invention thus contemplates the provision of a white bread of standard quality and characteristics which contains all of the constituents of a perfect food in properly balanced form. Such a loaf is attained by incorporating in the bread certain quantities of vitamines, proteins, and salts requisite to the normal diet, and in a form such as not to interfere with the action of the yeast, the baking qualities of the dough or otherwise, so as to detract in any manner from the resulting texture, color, flavor or other characteristics of the bread. The expression "modern bread made from bolted white wheat flour" used in the appended claims is intended to include such breads which are defined under the headings "White bread, wheat bread" and "Milk bread" in the pamphlet entitled "Food Inspection Decision 188," promulgated by the Secretary of Agriculture January 19, 1923, and reading as follows:

"Wheat bread dough, white bread dough, is the dough consisting of a leavened and kneaded mixture of flour, potable water, edible fat or oil, sugar and (or) other fermentable carbohydrate substance, salt, and yeast, with or without the addition of milk or a milk product, of diastatic and (or) proteolytic ferments, and of such limited amounts of unobjectionable salts as serve solely as yeast nutrients, and with or without the replacement of not more than three per cent (3%) of the flour ingredients by some other edible farinaceous substance.

Wheat bread, white bread, is the bread obtained by baking wheat bread dough in the form of a loaf or of rolls or other units smaller than a loaf. It contains, one hour or more after baking, not more than thirty-eight per cent (38%) of moisture, as determined upon the entire loaf or other unit.

Milk bread is the bread obtained by baking a wheat bread dough in which not less than one-third ($\frac{1}{3}$) of the water ingredient has been replaced by milk of the constituents of milk solids in proportions normal for whole milk. It conforms to the moisture limitation for wheat bread."

In the following claims which specify the proportion of vitamine B extract employed, it is to be understood that the figure given represents the percentage of an extract of the degree of concentration and the formula of the wheat germ product described in the above mentioned patent to Charles Hoffman et al., when evaporated to dryness as therein described. It will of course be understood that when extracts of different formulas or different degree of concentration are employed, some of which, for example, are described in the aforementioned patent to Charles Hoffman et al., the quantity added to the dough batch will have to be correspondingly varied.

It is to be understood that the source of these added compounds may vary, and to this extent certain variations and modifications may be introduced into the process of making the bread and adding the requisite materials, which modifications will, nevertheless, fall within the scope of this invention as defined in the appended claims.

I claim:

1. A white leavened bread having its texture, lightness and flavor comparable with modern bread made from bolted white wheat flour, said bread containing solids of whole milk amounting to from 10–12% calculated on the weight of the flour.

2. A white leavened bread having its texture, lightness and flavor comparable with modern bread made from bolted white wheat flour, said bread containing solids of whole milk amounting to from 10–12% calculated on the weight of the flour, and 5% of a preparation rich in water-soluble vitamine B.

3. A white leavened bread having its texture, lightness and flavor comparable with modern bread made from bolted white wheat flour, said bread containing 10–12% solids of whole milk, 5% of a preparation rich in water-soluble vitamine B, 3% of oleo oil and $\frac{1}{2}$–1% of innocuous calcium salts, all calculated on the weight of the flour.

4. A white leavened bread having its texture, lightness and flavor comparable with modern bread made from bolted white wheat flour, said bread containing 10–12% solids of whole milk, 5% of a preparation rich in water-soluble vitamine B, and $\frac{1}{2}$–1% of innocuous calcium salts, all calculated on the weight of the flour.

5. A white leavened bread having its texture, lightness and flavor comparable with modern bread made from bolted white wheat flour, said bread having its entire moisture content supplied by whole milk and containing in addition substantial quantities of a preparation rich in water-soluble vitamine B, a fatty substance rich in fat-soluble vitamine A, milk proteins and innocuous calcium salts.

6. A white leavened bread having its texture, lightness and flavor comparable with modern bread made from bolted white wheat flour, said bread having its entire moisture content supplied by whole milk and containing in addition substantial quantities of a preparation rich in water-soluble vitamine B, a substantial quantity of added milk proteins and innocuous calcium salts.

7. A white leavened bread having its texture, lightness and flavor comparable with modern bread made from bolted white wheat flour, said bread containing carbohydrates, proteins, mineral constituents and water-soluble B vitamine, each in the proportion required to sustain life and promote normal health and growth when said bread is the sole source of such food elements.

8. A white leavened bread having its texture, lightness and flavor comparable with modern bread made from bolted white wheat flour, said bread containing carbohydrates, proteins, mineral constituents and water-soluble B vitamine, and fat-soluble A vitamine, each in the proportion required to sustain life and promote normal health and growth when said bread is the sole source of such food elements.

In testimony whereof I affix my signature.

GEORGE SUMMERVILLE WARD.